A. D. RAY.
THERMOSTAT FOR RADIATORS.
APPLICATION FILED MAR. 10, 1920.
1,396,782. Patented Nov. 15, 1921.
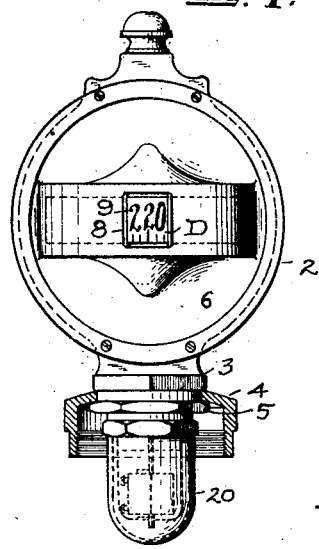
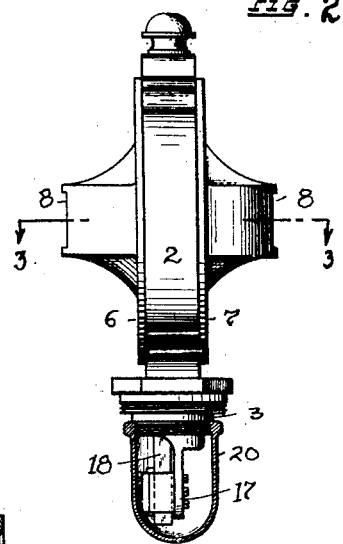
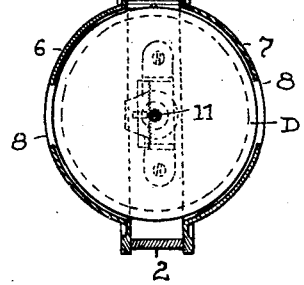
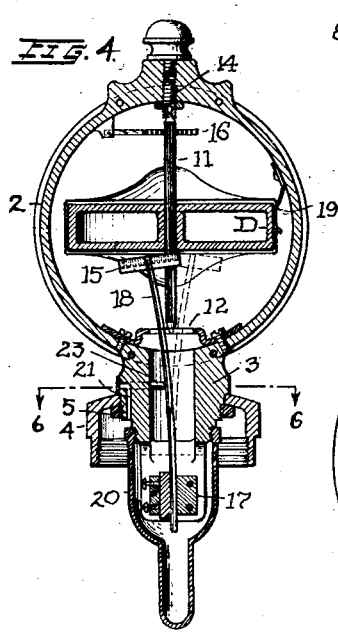
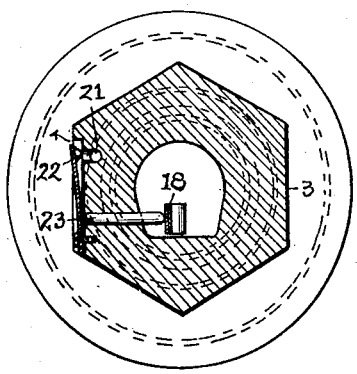
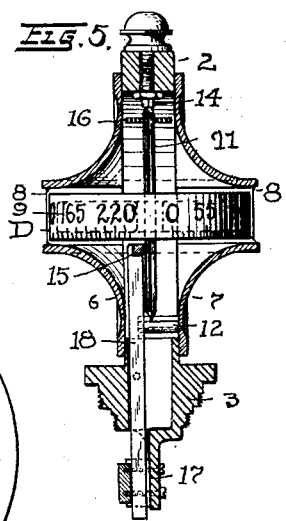
Inventor
A. D. Ray
By Fisher ——
Attorneys

UNITED STATES PATENT OFFICE.

ALBERT D. RAY, OF CLEVELAND, OHIO, ASSIGNOR TO WILLIAM O. JACKSON, OF NEW CASTLE, KENTUCKY.

THERMOSTAT FOR RADIATORS.

1,396,782.  Specification of Letters Patent.  Patented Nov. 15, 1921.

Application filed March 10, 1920. Serial No. 364,860.

*To all whom it may concern:*

Be it known that I, ALBERT D. RAY, a citizen of the United States, residing at Cleveland, in the county of Cuyahoga and State of Ohio, have invented certain new and useful Improvements in a Thermostat for Radiators, of which the following is a specification.

My invention comprises a thermostat or thermoscope, which is particularly constructed to indicate changes of temperature in an automobile radiator or other apparatus. As shown herein the device is detachably mounted upon a screw cap for an automobile radiator, and the changes in temperature within the radiator are indicated by the movement of a rotatable dial or wheel which is constantly visible to the driver of the machine. The device is also particularly constructed to operate automatically in relieving the radiator of steam and undesirable pressures whenever steam is generated within the radiator.

In the drawing accompanying this application, Figure 1 is a front view of the device mounted upon a radiator cap, which is shown in section. Fig. 2 is a side elevation of the device without the radiator cap. Fig. 3 is a horizontal sectional view on line 3—3, Fig. 2. Fig. 4 is a vertical section, centrally through the device, and Fig. 5 is a sectional view in a plane at right angles to Fig. 4. Fig. 6 is a horizontal cross section on line 6—6, Fig. 4.

The invention comprises a circular body 2 having a tubular neck 3 adapted to be detachably connected in a rotatable position centrally upon a flanged cap 4 having internal screw-threads wherewith to connect it to the water filling spout of an automobile radiator. A nut 5 holds the cap in place upon neck 3, and when this nut is not clamped tightly the cap may be turned independently of the body. Circular body 2 is in the form of an open ring having separate cover plates 6 and 7 mounted upon its opposite sides, and each cover plate has a lateral enlargement at its center to provide a circular recess within which a dial or disk D may rotate with its circumferential face opposite a central opening 8 within each cover plate. In this way either graduated marks, vari-colored sectors, or numerals 9 on the dial or disk may be displayed to indicate the range of temperatures within which the device works and one or more sets of graduations may be used on the disk.

Disk D is supported by a vertical shaft 11 having pointed ends seated in suitable bearings or brackets, and as shown the lower pointed end is supported by a bracket 12 within the bottom side of body 2 and the upper pointed end is socketed within an adjustable set screw 14 secured within the upper side of said body. Shaft 11 is fluted or has gear teeth longitudinally thereof adapted to be engaged by a segmental gear or rack 15 rigidly secured to the upper end of a thermo-member 18 composed of separate steel and brass strips permanently united together, and the said strip flexes or curves in opposite directions from a vertical line when marked variations in temperature occur in the place where said strip is situated. In the present instance, the thermo-member or strip 18 is clamped adjustably at its lower end to a depending portion or bracket 17 forming part of or affixed to the bottom side of neck 3 of body 2, and the strip extends upwardly through the tubular neck into the interior of body 2 where rack 15 is free to sweep in an arc when caused so to do by the flexing of the strip under different temperatures. In that event the rack rotates shaft 11 and the disk D, and the proper mark or numeral representing the degree of temperature for which the instrument is set is brought into view at one of the openings 8. A light spiral spring 16, corresponding to the balance spring of a watch, is attached to the upper end of shaft 11 and to a lug on the body, and this spring coacts with the thermo strip 18 to steady the disk in its movement. A light wire spring 19 may also be used as a frictional detent to prevent undue oscillatory movement of the disk through jars imparted to the body.

The lower end of the flexible strip or thermo-member 18 projects downwardly below neck 3, but said member is not directly exposed to the steam or water within the radiator. This is prevented by a tubular cap 20 which is screwed to the reduced bottom end of the neck, see Fig. 1.

A steam port 21 is also provided in neck 3 through which steam from the radiator may pass upwardly into the atmosphere when this port is opened by unseating a flat thin strip of spring metal which serves as a valve 22. This valve is pressed back and port 21 opened automatically when thermo-member 18 bends toward and engages a sliding pin 23 in neck 3, but this only occurs when the water in the radiator becomes extremely hot or steam accumulates therein.

For calibrating purposes, the thermo-strip is adjustably supported to shorten or lengthen the sweep or stroke of the rack which engages the fluted shaft, and this rack will work with the fluted shaft at different elevations wherever set. Thus, a higher or lower change in position of the rack will effect the degree of rotation of disk, the variation being brought by the difference in curvature at the same temperature in a long thermo-strip as compared with a shorter one.

What I claim is:

1. An attachment for radiators, comprising a flexible thermo-member and a rotatable disk indicator in gear connection and a supplemental spiral spring coacting with said parts to rotate said indicator, and a chambered body for said parts adapted to be connected with an automobile radiator.

2. A thermostat or thermoscope, comprising a chambered body adapted to be attached to a radiator and having an indicator mounted therein, a flexible thermo-element in the form of a strip supported vertically within said body, and means connecting said indicator and thermo-element operably together adapting said strip to be adjusted vertically in its support.

3. A thermostat or thermoscope, comprising a chambered body, a flexible thermo-element and a rotatable indicator, a fluted shaft for said indicator, a segmental gear for said thermo-element, means adapted to permit said gear to be moved longitudinally of said shaft, means adapted to detachably secure said body upon an automobile radiator, and an inclosing tube for said thermo-element exposed to the interior of said radiator.

Signed at Cleveland, in the county of Cuyahoga, and State of Ohio, this 6th day of March, 1920.

ALBERT D. RAY.